United States Patent Office 2,993,799
Patented July 25, 1961

2,993,799
PLASTIC CONTAINING COMPOSITION AND
THE PROCESS OF MAKING THE SAME
Charles L. Blake, 146 4th St., Belvidere, N.J.
No Drawing. Filed Aug. 20, 1957, Ser. No. 679,145
1 Claim. (Cl. 106—193)

This invention relates to a new lightweight construction material and to a process for making the same, and it has for its principal object to produce a water repellant, water tight and essentially fireproof non-ignitable material incorporating resinous plastics which act as a binder, the material being of such composition that it is usable in many different ways, in some of these uses being either technically superior to known materials or more economical than materials hitherto used.

Mixtures of thermoplastic or thermosetting plastics with fillers, such as wood flour or with minerals such as asbestos or slate flour, etc. have been proposed and this type of mixture has resulted in a number of new products. For instance a mixture containing wood flour has led to the manufacture of dinnerware from such mixture. However, the quantity of mineral or cellulosic fillers which can be introduced into such a mixture is limited, if necessary requirements with respect to strength, especially tensile strength, impact strength, flexural strength, brittleness, etc. are to be fulfilled. The main application in connection with mixtures of this type in which the fillers are of mineral origin, and more specifically consist of asbestos, has been the making of coatings on much stronger materials, for instance the making of coatings on pipes especially those transmitting oil or natural gas. When mineral fillers are used the specific gravity is usually raised by this introduction to such an extent that the use of the material for many purposes is excluded.

The invention essentially consists in a recycling process by means of which larger quantities of filler materials can be embodied into the mixture without producing the above named disadvantages. The introduction of a larger quantity of filler produces a smooth appearance similar to polished artificial stone or to asbestos cement products, with increased water repellent and fire resisting properties and an increased resistance to higher temperatures as well as a greater weatherproofness without in any way impairing the capability of the material of being molded or of being produced in endless sheets. Such a material containing essentially larger proportions of inert fillers, has a tensile and a flexural strength, as well as an impact strength which is higher than that of the mixtures now used, and which is also much higher than that of the plastic which is used as a binder; likewise the hardness and density of the material is very much increased in comparison with the hardness and density of the plastic material acting as a binder.

The material is therefore usable without difficulty as a building or construction material and for all kinds of outdoor uses.

Further the material may be colored and it may preferably be coated with an outer coat of plastics for decorative purposes; it may even be marbleized so that such a material is usable for indoor uses in buildings, such as paneling, or fireplace ornamentation or for like purposes.

The material may also be produced with a sufficient fluidity to apply it as a coating to other objects. Further the material may be given high insulating qualities which makes it possible to use sheets of this material as a baseboard for switchboards even of very large dimensions. The strength, density and insulating capacity of the material is sufficiently high to meet all requirements for such a use.

In connection with suitable plastics, plasticizers and solvents, it may be manufactured as a continuous sheet or may be applied as a coating in paste form and thus may be used for lining tanks or other containers or for surfacing roads, side walls, steps or foundations. Many other uses will be apparent from the following detailed specification or will be obvious to the expert in this field.

The material according to the invention as above stated is in the first place characterized by a considerably higher percentage of filler materials and asbestos relatively to the binder formed by the resinous plastic than is found in conventional mixtures. Nevertheless the filler material and the asbestos are bound as strongly and as completely as the materials are bound in any known mixture with a high plastic content. When compared with a known mixture which is made just with the percentage of plastic sufficient to produce a hard unitary material which is not brittle, the material according to the invention produces essentially the same properties with respect to cohesion, resistance to tensile forces and resistance to flexural stress with less plastic and more fillers, the latter giving to the material not only added hardness, but in some cases also a more desirable appearance, the fibrous or stone-like amorphous surface appearance being accentuated, while the costs which are largely dependent on the content in plastics are reduced. The product may be also given a more pleasing appearance by providing it with a plastic veneer which may be either colored or transparent or marbleized.

Known mixes of this type are usually produced by using about 30% to 60% of a plastic binder material with asbestiform material to which other mineral matter is added. The asbestiform material and the mineral material have all been finely ground and constitute between 40% to 70% of the mixture.

According to the invention the starting material is a mixture of a thermoplastic or thermosetting resinous plastic with asbestos, in the proportion of 20% to 30% of the plastic with about 15% of the asbestos, the percentage referring to the entire mixture. A plasticizer and inerts are added. The plasticizer produces the desired consistency of the mixture which may vary according to the process which is carried out or to the desired kind of product. The amount of plasticizer used therefore varies between 1% and 20% of the entire mixture.

The inerts are materials which determine the hardness, surface conditions of the mixture, etc. These inerts, described below, constitute about 50% to 60% of the mixture.

The process according to the invention is essentially a recycling process. The original mixture containing, as above stated, about 20% to 30% of resinous plastics forming the binder, is prepared and hardened. The hardened mixture is now finely ground. A new mixture is prepared which is similar to the original mixture in relative proportions with respect to materials which go into it, but to which 15% to 22½% of the finely ground material resulting from the grinding of the original mixture is added.

The finely ground material when incorporated into a mixture in which the original proportions have not been changed materially speeds up the binding action and makes the product more dense and harder and if suitable materials have been chosen as inerts, the material more closely resembles artificial stone or natural stone, although its brittleness has not increased.

The recycling process may be repeated, if necessary. Obviously the introduction of the ground mixture is not equivalent to the introduction of a larger quantity of a mineral filler into the original mixture but produces a much better and more intimate binding of all the materials which have been added.

The selection of the various parts of the mixture is governed by the properties which are to be developed.

The asbestos gives to the product its character and makes the material more fireproof. Also in the event of the use of the material on roads and sidewalks it makes it less slippery. This addition also is partly responsible for the increase in the tensile strength of the material.

The plastic is essentially used as a binder. Either thermoplastic or thermosetting plastics may be used. The term "plastics" also includes cellulose derivatives such as cellulose acetate, cellulose nitrate, cellulose-propionate, butyrate, etc.

More particularly the following plastics have been tested: polyester resins (such as "Mylar"), polyethylene (polythene), rubber resins (such as "Pliofilm"), vinyl resins, and especially vinylidene chloride ("Saran") and others.

Practically all of these types of resins and many others can be used.

The inert materials may also vary widely but in general two categories of inert materials are used. Those which essentially determine only the character of the body and of the texture and those which in addition also are figments, like many metal oxides and other metal compounds.

The first category comprises materials which are inexpensive and which determine the structure of the product. Silica in the form of sand, or of siliceous minerals, slate, especially in the form of slate flour, clay, ground limestone, hard coal, wood and especially wood flour, asbestine (asbestos waste) and mineral wastes of all kinds may be used as inerts of this category.

The second category of inert materials comprises essentially lithopone, titanium dioxide, cadmium oxide, zinc oxide, calcium sulphate, cadmium sulphide and barium sulphate, baryta and other metal oxides, sulphides and sulphates. Both categories of filler materials are however hard materials which may be finely divided and which do not react with the resin, all these materials being hereinafter in the specification and the claims termed "inert filler materials."

Any plasticizer compatible with the plastics which have been used is also usable in connection with this material. Plasticizers which have been used comprise diethyl phthalate, dimethyl phthalate, triethyl phosphate, triphenyl phosphate, ethox (dimethoxy ethyl phthalate), methyl Cellosolve stearate, triethylene dicaprylate. The above plasticizers are merely examples which have been frequently used.

The mixture is prepared and hardened using the normal processes. Thereafter it is finely ground. Further a similar mixture is prepared to which now between 15% to 22½% of the finely ground mixture resulting from the first process is added.

This other mixture may produce the final mix. This mixture contains:

|  | Percent |
| --- | --- |
| Asbestos | 12.75 |
| Plastic | 21.25 |
| Plasticizer | 8.50–15 |
| Inert | 42.50–36 |
| Finely ground material from first mixture | 15.00 |

This process may be repeated one or several times; the resulting material from the mixture made previously may again be finely ground and may be added to the extent of about 15% to the mixture which is prepared.

The final mixture is now treated according to the use which is to be made of the material. Preparing for instance a mixture to make railroad ties, the mixture to which the ground mixture has been added should be put into a mold for about 10 minutes at about 350° F. Then a pressure of approximately 5000 lb. per sq. in. is applied. The resulting tie will meet all the requirements of compressive and flexural strength, etc. necessary to be acceptable as a railroad tie.

On account of the highly insulating properties the material can especially be prepared for making switchboard plates and other insulating components either in a sheet or in a paste form. It may also be prepared by using a mold.

When using a mold a proper temperature of approximately 350° F. should be maintained and the finely ground material should be kept in the mold under pressure several minutes at about 5000 lbs. per sq. in. The material is then cooled in a water bath or stays in the mold which is provided with a water cooled jacket, and is cooled in the mold.

In making sheet material a continuous operation may take place, the material being mixed in a mixer starting from an original mix containing 15% asbestos, 25% plastics, about 10% of a plasticizer and about 50% of inerts. This mixture is finely ground and is added to make another mixture as above described.

In order to make a continuous sheet the mixture which contains the final material may be discharged into a hopper which in its turn discharges the material between mixing rolls which can be heated or water cooled depending on the desired temperature. If they have been heated a continuous sheet is formed between the rolls which is then drawn through a water cooled tank, then to the heating and presser rolls which also control the thickness of the material forming the continuous sheet. To decorate or improve the surface it is of advantage to cover the sheet with a veneer such as a thin coating of suitably colored material flowing from a hopper; or alternatively, a clear plastic may be sprayed over the sheet for protection and good looks. Alternatively slate flour mixed with a plastic and coloring material and brought into a fluid state may be sprayed on the sheet to produce a coating if desired. Behind the heating and pressure rolls which supply the above mentioned temperature and pressure a cutter may be arranged which cuts the sheet into sections, which may be carried away on a take-off belt. Such a sheet may then be used when cut into sections for switchboards and the like on account of the excellent insulating properties of the material.

The advantage connected with sheets of this type consists in the first place in the fact that the sheets are more fireproof than regular plastic sheets, and that their insulating properties make them an excellent insulator. Also it is of advantage to spray a plastic colored paint on the sheet on its way to the heating roll, if a decorative appearance is to be achieved.

The material can also of course be used for making boxes, containers, and the like. Also heavy lining for box cars, swimming pools and the like may be produced, it also may be used for making flower pots and vases, and in this case it is preferably molded or made from sheeting.

When molding the material it should be heated again to about 350° F. and kept under a pressure of 5000 lbs. per sq. in. for several minutes. Then it may be cooled directly in a water bath or in a water cooled jacket on the mold. To produce moldable material sheets may be cut into pellets and then remolded or the material can also be used in paste form as stated below. When molded, either in its original form or in pellet form, it should again be heated to about 350° F.

Pipes and small stacks may also be formed from this material either by using the paste form discussed below or by using a mold and by heating the material again to approximately 350° F. under 5000 lbs. per sq. in. and then cooling it off either in a direct water bath or by putting a water cooled jacket around the mold.

The sections of pipe thus produced may then be welded together to the desired length by using the regular welding technique or by making a hot plate which encircles the pipe and which can be heated while the ends of the pipe are in contact with the hot plate until the plastic starts to soften. The two ends after softening will then be put together for the welding. The temperature of the hot plate for this preheating of the pipe sections should again be 350°.

Still another use of the mixture consists in making sleeves or boots for telephone poles or for other masts carrying electric wires which may be so formed that that part of the pole which goes into the ground is held within the sleeve or boot. In order to make the boot fit a paste made of the final mix material may be filled into the space between the pole and the boot.

Another method of treating the material consists in producing the material in the form of a wet paste. This is obtained by preparing the material in proper consistency and by dissolving the material in a proper solvent. In order to obtain the desired consistency a suitable amount of solvent is added to the mixture. A proper solvent to make such a paste consists for example of acetone, alcohol, pentane, ether, methylene chloride, alcohol, etc.

By means of a paste prepared by the dissolution of the final mixture in one of the above solvents it may be used for various purposes for instance as a patchwork for patching up roads, tiles, roofs, etc.

Also a plastic cement can be made which is acid resistant and corrosion resistant and which may be used for various purposes.

The material when brought into the shape of a wet paste form may for instance be used for lining tanks, although such lining could also be produced by using material in sheet form as above described.

The material above described when mixed with the desired solvent must be compatible with the type of plastic which has been used, so as to obtain the proper consistency. It may then for instance be used for the covering of highways or roads, sidewalks or steps and foundations, and preferably if used in this way a reinforcing material is embedded into the plastic material in the form of a network of parallel wires or the like, and when used for roads or highways or sidewalks the advantage is that a much lighter material must be handled so that the construction is much easier, the material is much less liable to get slippery and it also prevents skidding especially if made with asbestos or other fibrous material. Also this material can be colored permanently with a color fast plastic paint while in paste form.

From the above it will be seen that the new material has a much wider application than most mixtures prepared, on account of the fact that the smaller content in plastics makes it economically feasible to use partly plastic material and the increased hardness and solidity of the material makes it better adapted to withstand external forces and wear.

It will be clear that minor changes may be made without in any way departing from the essence of the invention as defined in the annexed claim.

Having described the invention, what is claimed is:

A process of producing a material containing asbestos, another mineral filler and a plastic as a binder which consists in preparing a mixture consisting essentially of approximately 12.75 to 15% by weight of asbestos; approximately 20 to 30% by weight of a resinous binder selected from the group consisting of polyesters, polyethylene, polyvinylidene chloride, cellulose acetate, cellulose nitrate and cellulose propionate; approximately 1 to 20% by weight of a plasticizer for said resinous binder selected from the group consisting of diethyl phthalate, dimethyl phthalate, triethyl phosphate, triphenyl phosphate, dimethoxy ethyl phthalate, ethylene glycol monomethyl ether stearate, triethylene dicaprylate; and approximately 50 to 60% by weight of finely divided filler material selected from the group consisting of silica, slate flour, clay and limestone; and then hardening the resinous binder by subjecting the mixture to an elevated temperature and an elevated pressure for a time sufficient to harden the resinous binder; grinding the resultant hardened material to produce a finely ground composition; and then admixing the finely ground composition uniformly into a second mixture in a quantity whereby the ground composition represents 15 to 25.5% by weight of the second mixture, the remainder of the second mixture consisting essentially of 12.75 to 15% by weight of asbestos; approximately 20 to 30% by weight of a resinous binder selected from the group consisting of polyesters, polyethylene, polyvinylidene chloride, cellulose acetate, cellulose nitrate and cellulose propionate; approximately 7 to 20% by weight of a plasticizer for said resinous binder selected from the group consisting of diethyl phthalate, dimethyl phthalate, triethyl phosphate, triphenyl phosphate, dimethoxy ethyl phthalate, ethylene glycol monomethyl ether stearate, triethylene dicaprylate; and approximately 50 to 60% by weight of finely divided filler material selected from the group consisting of silica, slate flour, clay and limestone.

References Cited in the file of this patent

UNITED STATES PATENTS

| Number | Name | Date |
|---|---|---|
| 1,454,939 | Michaelson | May 15, 1923 |
| 1,996,757 | Elbel | Apr. 9, 1935 |
| 2,066,734 | Loetscher | Jan. 5, 1937 |
| 2,067,012 | Loetscher | Jan. 5, 1937 |
| 2,189,889 | Engel | Feb. 13, 1940 |
| 2,325,570 | Katzen et al. | July 27, 1943 |